(12) United States Patent
Brink et al.

(10) Patent No.: US 8,205,019 B2
(45) Date of Patent: Jun. 19, 2012

(54) DMA TRANSFERS OF SETS OF DATA AND AN EXCLUSIVE OR (XOR) OF THE SETS OF DATA

(75) Inventors: Peter C. Brink, Tempe, AZ (US); Richard G. Boyd, Gilbert, AZ (US); Brian J. Skerry, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 169 days.

(21) Appl. No.: 11/240,757

(22) Filed: Sep. 30, 2005

(65) Prior Publication Data

US 2007/0079017 A1    Apr. 5, 2007

(51) Int. Cl.
*G06F 13/28* (2006.01)
*G06F 15/167* (2006.01)

(52) U.S. Cl. .......................... 710/22; 709/212
(58) Field of Classification Search .............. 710/22; 709/212

See application file for complete search history.

(56) References Cited

U.S. PATENT DOCUMENTS

| | | | | |
|---|---|---|---|---|
| 4,475,155 A | * | 10/1984 | Oishi et al. ............... | 710/22 |
| 5,101,492 A | * | 3/1992 | Schultz et al. ............. | 714/7 |
| 5,206,943 A | * | 4/1993 | Callison et al. ............ | 711/114 |
| 5,333,305 A | * | 7/1994 | Neufeld ................... | 714/5 |
| 5,682,509 A | * | 10/1997 | Kabenjian ................ | 710/312 |
| 5,742,752 A | * | 4/1998 | DeKoning ................ | 714/6 |
| 6,070,182 A | | 5/2000 | Rao et al. | |
| 6,145,043 A | | 11/2000 | Sych et al. | |
| 6,151,641 A | * | 11/2000 | Herbert .................... | 710/22 |
| 6,999,771 B1 | | 2/2006 | Kasapi et al. | |
| 7,039,363 B1 | | 5/2006 | Kasapi et al. | |
| 7,287,101 B2 | | 10/2007 | Futral et al. | |
| 7,509,559 B2 | | 3/2009 | Mackey | |
| 2005/0204185 A1 | | 9/2005 | Tait et al. | |
| 2005/0223269 A1 | * | 10/2005 | Stolowitz ................. | 714/6 |
| 2005/0228917 A1 | | 10/2005 | Brink et al. | |
| 2007/0005858 A1 | | 1/2007 | Shah et al. | |

FOREIGN PATENT DOCUMENTS

| | | |
|---|---|---|
| WO | WO 97/32182 | 9/1997 |
| WO | WO-9732182 | 9/1997 |

(Continued)

OTHER PUBLICATIONS

Intel Corporation, "Intel 80332 I/O Processor Developer's Manual", Document No. 274065-002US, (Aug. 2004),pp. 41-48 & 375-408.

(Continued)

*Primary Examiner* — Chun-Kuan Lee
*Assistant Examiner* — Farley Abad
(74) *Attorney, Agent, or Firm* — Blakely, Sokoloff, Taylor & Zafman LLP

(57) ABSTRACT

Methods and apparatus for performing Direct Memory Access (DMA) transfers of sets of data and results of performing logical operations on the sets of data are disclosed. In one aspect, a method may include receiving a data structure that specifies DMA transfers of sets of data and a DMA transfer of a logical operation, such as an exclusive OR, on the sets of data. In response to receiving the data structure, the DMA transfers of the sets of data, and the DMA transfer of the logical operation performed on the sets of data may be performed.

12 Claims, 7 Drawing Sheets

FOREIGN PATENT DOCUMENTS

| | | |
|---|---|---|
| WO | WO 99/17212 | 4/1999 |
| WO | WO 2005/054780 | 6/2005 |
| WO | WO-2005054780 | 6/2005 |
| WO | WO 97/32182 | 9/2007 |

OTHER PUBLICATIONS

Intel Corporation, "Intel IOP332 I/O Processor with Intel XScale Microarchitecture", www.intel.com, (Aug. 14, 2005),3 pages.

Intel Corporation, "Intel RAID Controller SRCS28X An eight-port Serial ATA II RAID solution for applications requiring high performance and reliability", Intel Literature Order No. 300598-001US, (2005),4 pages.

Intel Corporation, "Intel RAID Controller SRCU42E, A full-featured, high-end, dual-channel Ultra320 RAID Controller with PCI Express* x8 interface", Intel Literature Oder No. 300596-001US, (2004),4 pages.

* cited by examiner

DMA TRANSFERS OF SETS OF DATA AND AN EXCLUSIVE OR (XOR) OF THE SETS OF DATA

BACKGROUND

1. Field

Embodiments of the invention relate to the field of Direct Memory Access (DMA). In particular, embodiments of the invention relate to DMA transfers of sets of data and a logical operation, such as, for example, exclusive OR (XOR), performed on the sets of data.

2. Background Information

Direct memory access (DMA) is a technology that may allow certain hardware subsystems within a computer systems architecture to transfer data to and from a system memory with substantially less processor involvement. Without DMA, the processor might otherwise copy the data from a source to one of its registers, and then write the data back to another location. Due to heavy involvement, the processor may have reduced availability for performing other tasks during such data transfers.

Exclusive OR (XOR) operations may be performed on data for various reasons, such as, for example, to create parity information for data reliability. DMA may be used to transfer results of performing XOR operations on sets of data.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
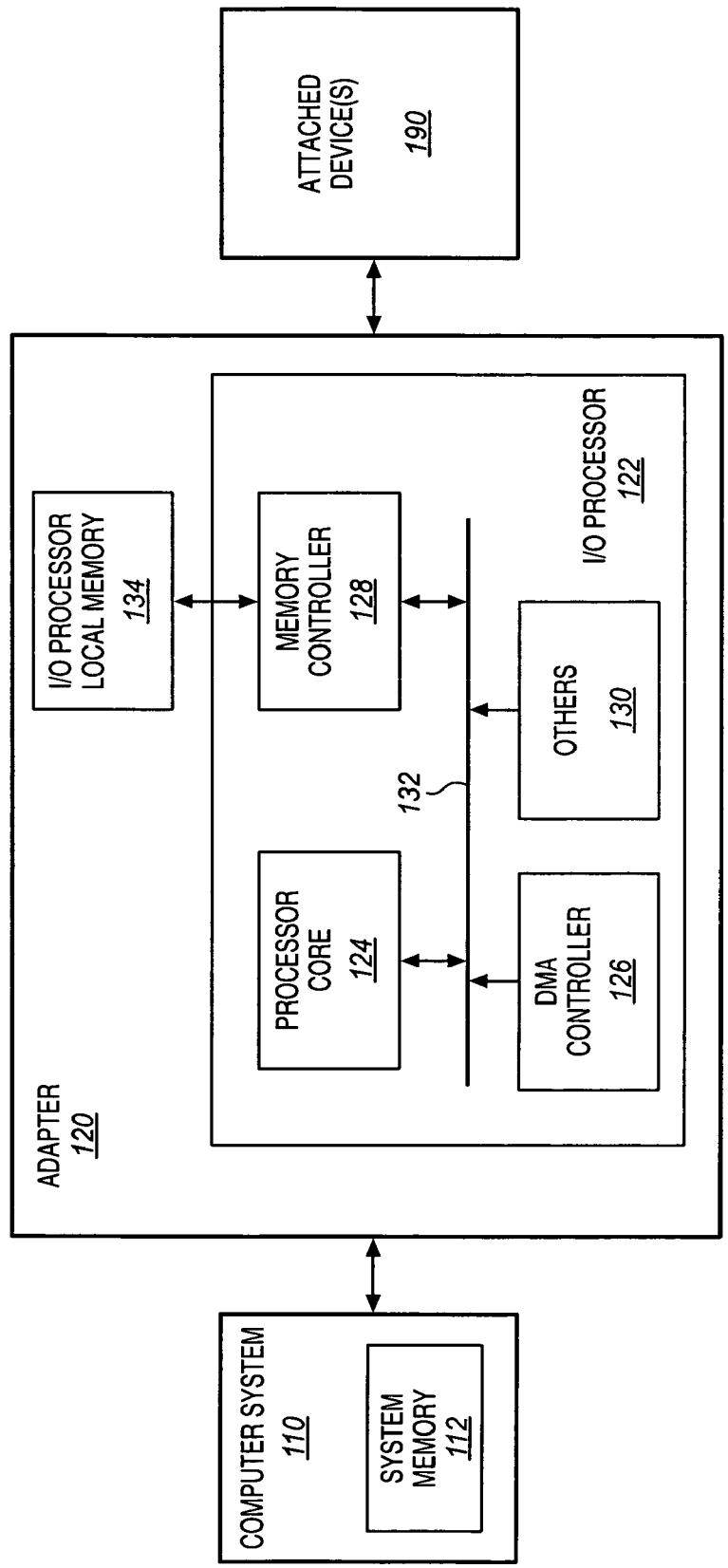
FIG. 1 is a block diagram showing a computer systems architecture in which one or more embodiments of the invention may be implemented.

FIG. 1 is a block diagram showing a computer systems architecture 100 in which one or more embodiments of the invention may be implemented. The computer systems architecture includes a computer system 110, an adapter 120, and one or more attached device(s) 190. The adapter may be coupled with, or otherwise in communication with, the computer system. The attached device(s) may be coupled with, or otherwise in communication with, the adapter.

In this description, the terms "coupled" and "connected," along with their derivatives, may be used. These terms are not intended as synonyms for each other. Rather, in particular embodiments, "connected" may be used to indicate that two or more components are in direct physical or electrical contact with each other. "Coupled" may mean that two or more components are in direct physical or electrical contact. However, "coupled" may also mean that two or more components are not in direct contact with each other, but yet may still co-operate or interact with each other. For example, two or more components may be coupled with one another via one or more intervening components that allow them to interact. In addition, two or more components may be in communication with one another if they exchange data or information, regardless of whether they are in direct contact or not.

The computer system includes a system memory 112, such as, for example, a Dynamic Random Access Memory (DRAM). DRAM are included in some, but not all, computer systems. The illustrated adapter includes an input/output (I/O) processor 122 and an I/O processor local memory 134. By way of example, the I/O processor may include a system-on-chip, although the scope of the invention is not limited in this respect.

The illustrated I/O processor includes a processor core 124, a DMA controller 126, a memory controller 128, optionally one or more other components 130, and one or more interconnects 132, such as, for example, one or more buses. Specific examples of other components that are suitable are disclosed below. As shown, the core, the DMA controller, and the memory controller, may each be coupled with, or otherwise in communication with, the one or more buses. Likewise, the core, the DMA controller, and the memory controller, may each be coupled with, or otherwise in communication with, one another, via the one or more intervening buses.

The I/O processor local memory may be coupled with, or otherwise in communication with, the memory controller. As shown in the illustrated adapter, the I/O processor local memory may be external to the I/O processor, although this is not required. For example, an alternate adapter having the I/O processor local memory integrated with the I/O processor in a system-on-chip is also suitable. Suitable I/O processor local memories include, but are not limited to, those including Double Data Rate-Synchronous DRAM (DDR-SDRAM). DDR-SDRAM is also known as SDRAM II and DDRAM.

The adapter may assist with exchange of data between the computer system and the attached device(s). In particular, the DMA controller may perform DMA transfers of data between a source, such as, for example, the system memory of the computer system, and a destination, such as, for example, the I/O processor local memory. The DMA controller may request and receive control of the relevant buses and transfer the data directly with limited involvement of the I/O processor core and/or without the data passing through the I/O processor core. DMA may allow fast exchange of data, low interrupt load on the core, and may allow the core to perform other tasks during data transfer. However, the scope of the invention is not limited to achieving these particular advantages.

When appropriate, the data stored in the I/O processor local memory of the adapter may be forwarded to the attached devices, although the scope of the invention is not limited in this respect. That is, the architecture may include a store-and-forward architecture. In one or more embodiments of the invention, the attached device(s) may include one or more storage devices, such as, for example, storage disk arrays. Alternatively, the attached device(s) may include other I/O devices or other peripheral devices. The adapter may optionally be used as a network interface card to provide data to a network, and the attached device(s) may be coupled or in communication with the adapter by the network.

Figure 2:
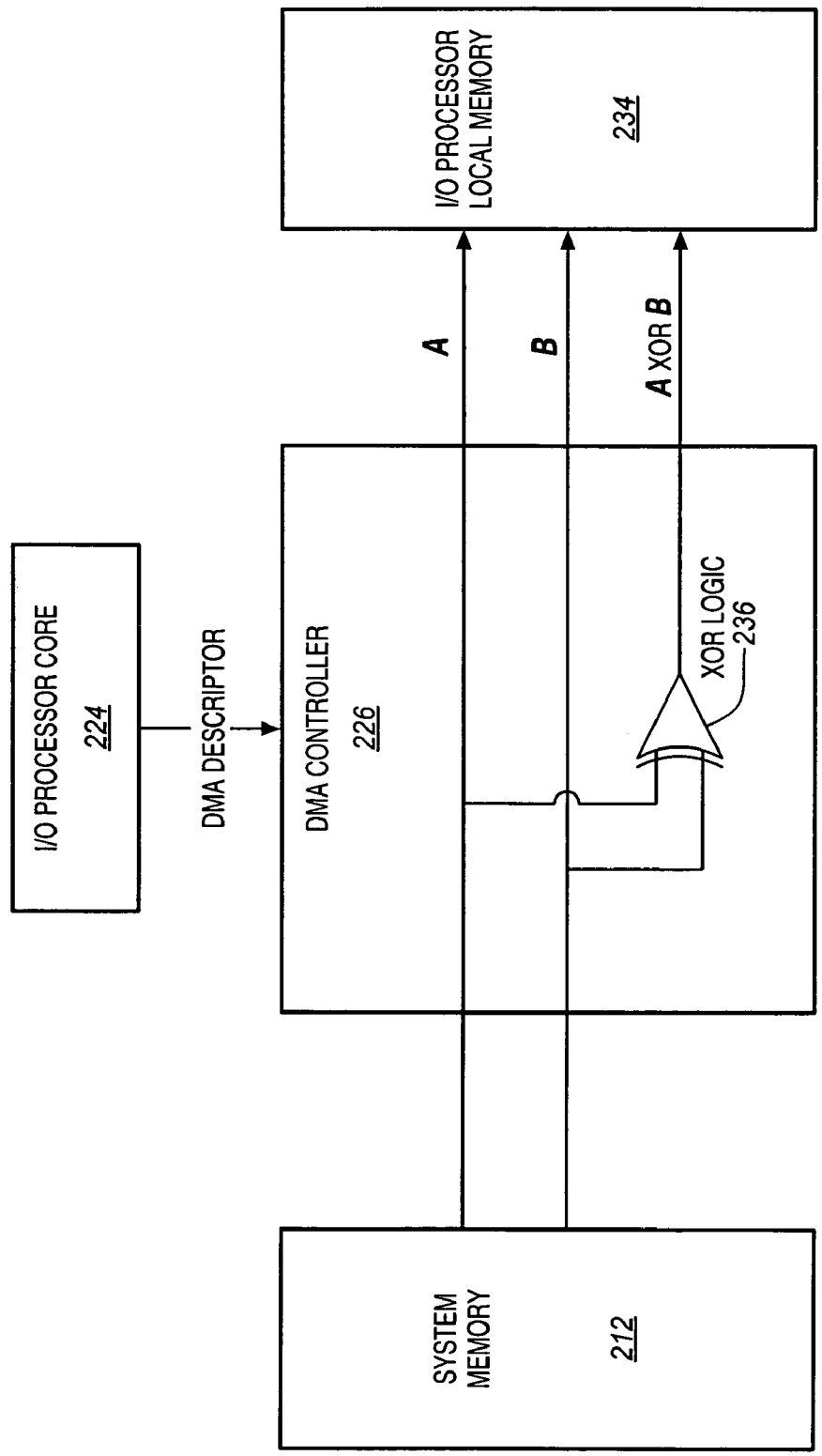
FIG. 2 is a block diagram showing a DMA controller performing DMA transfers of sets of data and an exclusive OR of the sets of data, according to one or more embodiments of the invention.

FIG. 2 is a block diagram showing a DMA controller performing DMA transfers of sets of data and an exclusive OR (XOR) of the sets of data, according to one or more embodiments of the invention. The block diagram includes a DMA controller 226, an I/O processor core 224, a system memory 212, and an I/O processor local memory 234.

These aforementioned components may optionally have some or all of the characteristics of the correspondingly named components of the computer systems architecture shown in FIG. 1. To avoid obscuring the following description, the discussion below will tend to focus primarily on different and/or additional characteristics.

In one aspect, the DMA controller may be programmable through the I/O processor core. For example, the I/O processor core may generate and provide a data structure, such as, for example, a DMA descriptor, to the DMA controller. The data structure may include structured data that has physical and/or logical relations, such as, for example, to support data manipulation by the DMA controller. The DMA descriptor may optionally be a chain descriptor having a pointer or other link to another DMA descriptor, although the scope of the invention is not limited in this respect.

Figure 3:
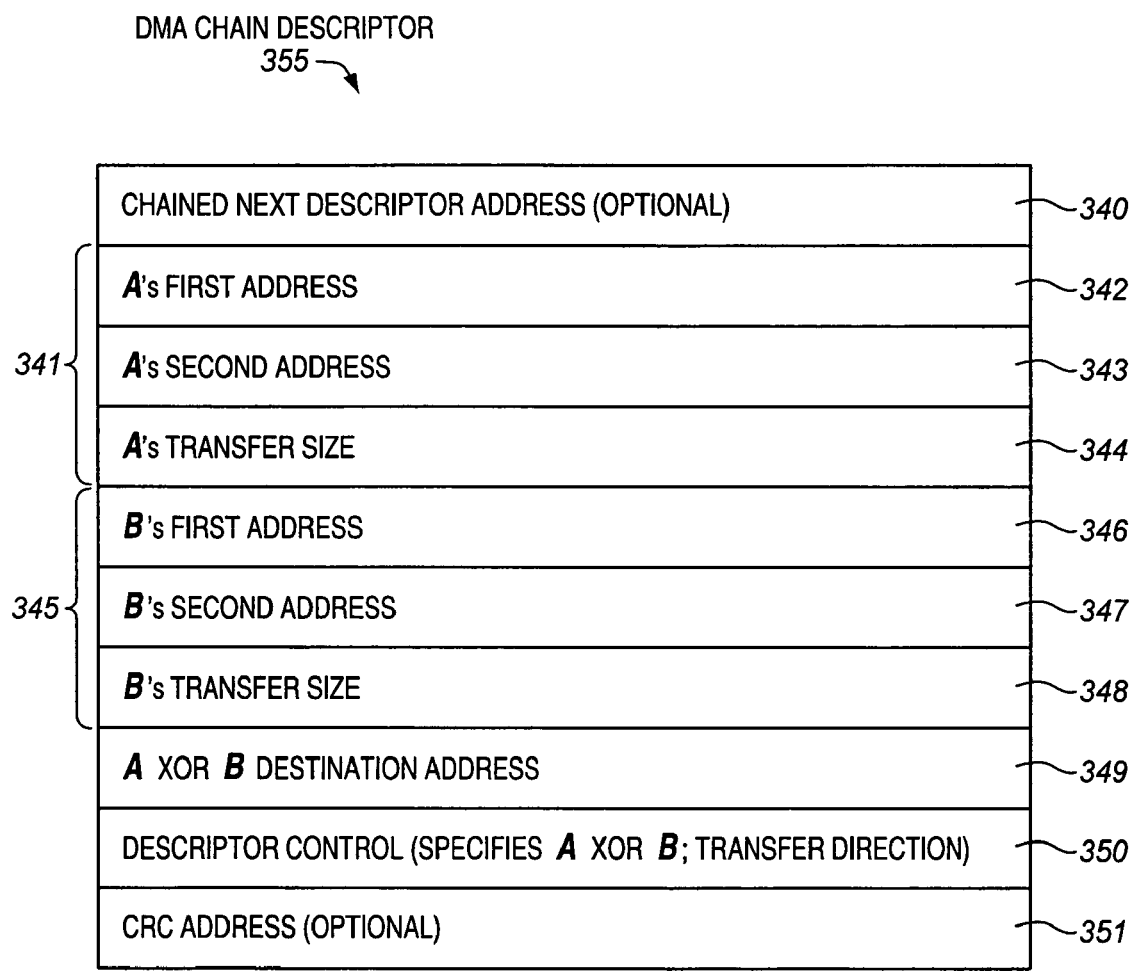
FIG. 3 shows a DMA chain descriptor that specifies DMA transfers of a plurality of sets of data and an exclusive OR of the plurality of sets of data, according to one or more embodiments of the invention.

FIG. 3 shows a DMA chain descriptor 355 that specifies DMA transfers of a plurality of sets of data and also a DMA transfer of an exclusive OR (XOR) of the plurality of sets of data, according to one or more embodiments of the invention. This is just one illustrative DMA chain descriptor. Other DMA chain descriptors are contemplated, and will be apparent to those skilled in the art and having the benefit of the present disclosure. Further, an XOR is just one of numerous logical operations that may be specified by a DMA descriptor. Other suitable logical operations include, but are not limited to, AND, OR, NOT, and other known logical operations, as well as combinations thereof.

The DMA chain descriptor includes an optional chained next descriptor address 340. The next descriptor address may have a particular value, such as, for example, zero, to specify an end of a chain.

The DMA chain descriptor also includes data specifying a DMA transfer of a first set of data (A) 341, data specifying a DMA transfer of a second set of data (B) 345, and data specifying a DMA transfer of an XOR of the first and second sets of data (A XOR B) 349,350.

The data specifying the DMA transfer of the first set of data (A) 341 includes A's first source/destination address 342, A's second source/destination address 343, and A's transfer size 344, such as, for example, a byte count. Likewise, the data specifying the DMA transfer of the second set of data (B) 345 includes B's first source/destination address 346, B's second source/destination address 347, and B's transfer size 348.

In one particular embodiment of the invention, the first source/destination addresses may be host-side or computer system-side remote addresses, such as, for example addresses on a PCI-type bus. In this particular embodiment, the second source/destination addresses may be adapter-side local addresses, such as, for example, of the I/O processor local memory. A direction of transfer specified by the DMA chain descriptor, such as, for example, in the control information discussed below, may determine whether the first and second addresses are source addresses or destination addresses, respectively. However, the scope of the invention is not limited to this particular embodiment.

The data specifying the DMA transfer of the XOR of the first and second sets of data (A XOR B) 349, 350 includes a destination address for A XOR B 349, and data included in a descriptor control 350, which specifies whether or not a particular logical operation, such as, in this example, an XOR operation, is to be performed on the first and second sets of data. In one or more embodiments of the invention, a bit of the descriptor control information may have a first value (for example 1) if an XOR operation and corresponding DMA transfer of the result of the XOR operation are to be performed or may have a second value (for example 0) if they are not to be performed, although the scope of the invention is not so limited. The descriptor control may also specify a direction of data transfer, such as, for example, from system memory to I/O processor local memory, or from I/O processor local memory to system memory, or toward the host, or away from the host, etc. The descriptor control may also optionally include other information.

Now, the illustrated descriptor is just one possible descriptor. Other descriptors are contemplated and will be apparent to those skilled in the art and having the benefit of the present disclosure. For example, rather than specifying transfer sizes, end addresses may optionally be specified. As another example, rather than specifying direction of transfer, source addresses and destination addresses may be specified. Other modifications are also contemplated and will be apparent to those skilled in the art and having the benefit of the present disclosure. As previously stated, logical operations other than XOR operations may be specified.

The DMA chain descriptor further includes an optional cyclic redundancy check (CRC) address 351. This is optional, and even if it is included, may optionally be conventional. In one or more embodiments of the invention, a logical CRC operation on data may optionally be transferred in place of, or in addition to, the aforementioned XOR of the sets of data, as specified by, and in response to a single DMA descriptor.

Referring again to FIG. 2, the DMA controller may receive the DMA descriptor, such as, for example, the DMA chain descriptor shown in FIG. 3, or one like it, or another DMA descriptor entirely. In one or more embodiments of the invention, the DMA controller may receive the DMA descriptor or data structure over a bus or other interconnect that may be coupled between the DMA controller and a processor or processor core, such as, for example, the I/O processor core.

The DMA descriptor may be used to program or inform or otherwise result in the DMA controller to perform specified DMA transfers. In response to receiving the DMA descriptor, or at least after receiving the DMA descriptor, the DMA controller may perform DMA transfers that are specified or indicated by the DMA descriptor.

The DMA controller may parse or otherwise examine the DMA descriptor. The DMA controller may determine the source/destination addresses of the sets of data, the sizes of the sets of data. In various aspects of the invention, the sizes of the sets of data may be 64K, 128K, other proportions of a block of data, or other sizes suitable for the particular implementation. The scope of the invention is not limited to any known size of data transfer.

The DMA controller may also determine the direction of data transfer. As shown in the illustrated embodiment, the direction of transfer may be from the system memory to the I/O processor local memory, although the scope of the invention is not so limited. For example, in one or more alternate embodiments, the direction of transfer may be from the I/O processor local memory to the system memory.

The DMA controller may further determine whether or not the DMA descriptor specifies that a logical operation, such as, for example, an XOR operation, and corresponding DMA transfer of the result of the logical operation, such as, for example, the XOR operation, are to be performed. In one or more embodiments of the invention, DMA controller may examine a bit or field or other portion of the descriptor control field of the DMA descriptor to determine whether or not the XOR operation and corresponding DMA transfer are to be performed, although the scope of the invention is not limited in this respect. For example, an additional or otherwise different field or other portion may be used to specify whether or not the XOR operation and corresponding DMA transfer of the result of the XOR operation are to be performed. As one example, performance of the XOR operation and corresponding DMA transfer of the result of the XOR operation may be specified if a non-default value, such as, for example, a non zero value, is included in the A XOR B destination address. A default value may specify that the XOR operation need not be performed. Other possibilities are also contemplated.

In response to receiving the DMA descriptor, or at least after receiving the DMA descriptor, the DMA transfers specified or indicated by the DMA descriptor may be initiated. The DMA controller may activate or enable one or more DMA channels. In one or more embodiments of the invention, a common channel may be used to transfer the different sets of data and the XOR of the different sets of data serially, although the scope of the invention is not limited in this respect. In one aspect, the common channel may correspond to a given processor core and one or more other optional processor cores may use other channels, although the scope of the invention is not limited in this respect.

Once the one or more DMA channels have been activated or enabled, the DMA controller may access or otherwise receive the sets of data to be transferred from the source to the destination. The DMA controller may use the byte counts or other transfer sizes specified in the DMA descriptor to know how much data to access. The sets of data may optionally be accessed either in series, or in parallel, or some sets may be accessed in series and others in parallel. Either one or more than one DMA channel may optionally be used.

After the sets of data have been accessed, if the DMA descriptor specifies that an XOR operation is to be performed, the DMA controller may perform an XOR operation on the sets of data. XOR operations are well-known logical operations. A XOR B may return a true value if A and B are not the same and a false value if A and B are the same. That is, A XOR B may be written as ((NOT A AND B) OR (A AND NOT B)). In other words, A XOR B may mean one or the other, but not both, of A and B being true.

Referring again to FIG. 2, the DMA controller includes XOR logic 236. Various types of conventional XOR logic known in the arts may optionally be used. The scope of the invention is not limited to any known XOR logic.

The different sets of data may be provided to the XOR logic and one or more logical operations, in this example XOR operations, may be performed on the data. For example, as shown in the illustrated embodiment, the sets of data A and B may be provided to the XOR logic and the result A XOR B may be determined or generated by the XOR logic. As another example, in another embodiment, the sets of data P, Q, and R may be provided and the result P XOR Q XOR R may be determined or generated by the XOR logic. Other sets of data may likewise optionally be added.

In one or more embodiments of the invention, an XOR of the sets of data may be generated before a DMA transfer of at least one of the sets of data from the DMA controller to another location is performed. For example, A XOR B may be generated before the DMA transfer of B to the I/O processor local memory is performed or occurs.

Performing the XOR operation, or other logical operation, on data as the data passes through the DMA controller may avoid a need to subsequently re-access or re-receive the data, such as, for example, from the I/O processor local memory, which may help to reduce traffic on one or more buses, such as, for example, one or more buses coupling the DMA controller with the I/O processor local memory. However, the scope of the invention is not limited in this respect.

The DMA transfers may be performed in series, or in parallel, or some of the DMA transfers may be performed in series and others may be performed in parallel. In one particular embodiment of the invention, a first set of data (for example A) may be transferred first. Then, a second set of data (for example B) may be transferred. According to one or more embodiments of the invention, an XOR of the first and second sets of data (for example A XOR B) may be transferred at least partially substantially concurrently, or at least partially at about the same time, as the DMA transfer of one of the sets of data (for example B). That is, A XOR B may be performed in-line and in real time with the transfer of B. Alternatively, the XOR of the sets of data may be stored, such as, for example, in a local buffer, and transferred after the last of the sets of data (for example B) has been transferred.

Figure 4:
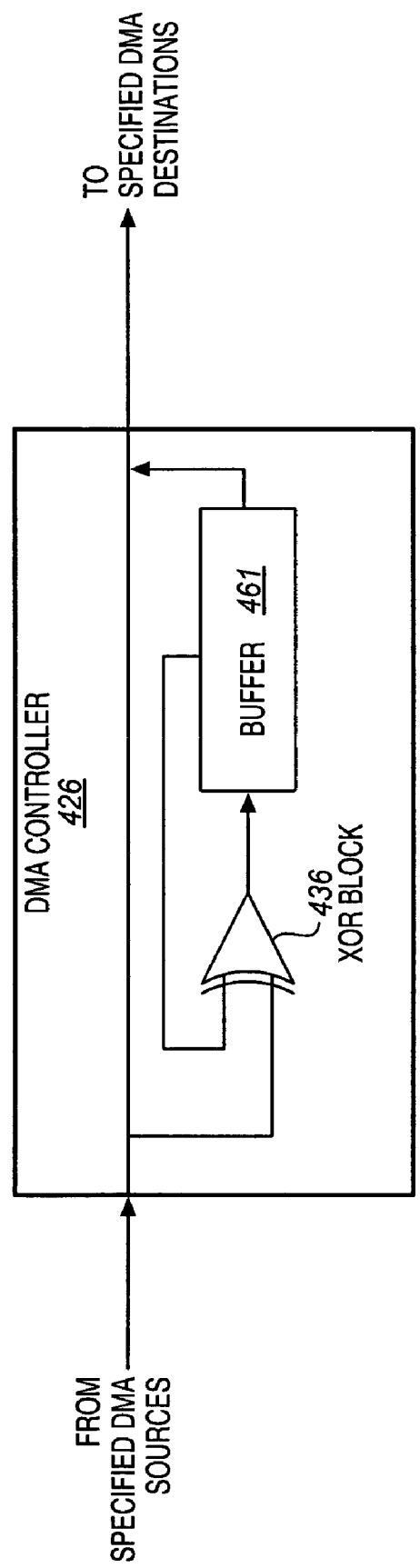
FIG. 4 is a block diagram showing a DMA controller including XOR logic to perform XOR operations and a buffer or other small memory to store results of the XOR operations, according to one or more embodiments of the invention.

FIG. 4 is a block diagram showing a DMA controller 426 including an XOR block 436 to perform XOR operations on sets of data and a small memory 461, such as, for example, a buffer, to store a results of performing one or more XOR operations on the sets of data, according to one or more embodiments of the invention. The buffer may be included in the DMA controller or otherwise on the adapter.

An exemplary method of using the XOR logic and buffer in combination, according to one or more embodiments of the invention, will now be described. An initial default value, for example all zeros, may be stored in the buffer. Then, during the DMA transfer of a first set of data (for example A), the first set of data (for example A) may be provided to the DMA controller from a specified DMA source. As shown, within the DMA controller, the first set of data (for example A) may both be transferred to a specified DMA destination, and provided as input to the XOR block. In parallel, the initial default value stored in the buffer may be provided to the XOR logic. The XOR logic may perform an XOR operation on the first set of data (for example A) and the initial default value to generate an intermediate result. In this example, since the initial default value was all zeros, the intermediate result may be just the regenerated first set of data (for example A) back again. The XOR block may include logic to make the following determinations or evaluations A XOR 0=A, and A XOR 1=NOT A. So, if the buffer is cleared or includes all zeros before the first XOR operation, then the result of performing an XOR operation of the input stream from a DMA source and the contents of the buffer is just the input stream back again. The intermediate result may be provided to and stored in the buffer.

Then, during a subsequent DMA transfer of a second set of data (for example B), the second set of data (for example B) and the intermediate value from the buffer may be provided to the XOR logic. The XOR logic may perform an XOR operation on the second set of data (for example B) and the intermediate result, which in this example is the first set of data (for example A), to generate a final result. By way of example, the final result may be A XOR B. This XOR operation may be performed in-line, and in real time, when the DMA transfer of the second set of data (for example B) occurs. The final result may either be transferred substantially concurrently or in parallel or at substantially the same time as the transfer of the second set data (for example B), or alternatively, the final result may be provided to the buffer and stored for a brief period of time or delay, and then transferred subsequently. In this way, an XOR result may be build serially in a buffer and as different sets of data provides as input to the XOR logic are transferred to their different destinations. Traffic on buses associated with the DMA transfers may also be reduced since the XOR result may be generated from data already in the DMA controller.

In one or more embodiments of the invention, due at least in part to the specifications of the DMA descriptor, the DMA transfers of the sets of data and the DMA transfer of the XOR of the sets of data may be performed back-to-back without an intervening interrupt of a processor, such as, for example, the I/O processor core. Eliminating an interrupt, or at least reducing interrupts, may offer known advantages.

After the DMA transfers have been completed, the DMA controller may signal to the I/O processor core that DMA transfers have been completed. The one or more DMA channels may then be deactivated.

Figure 5:
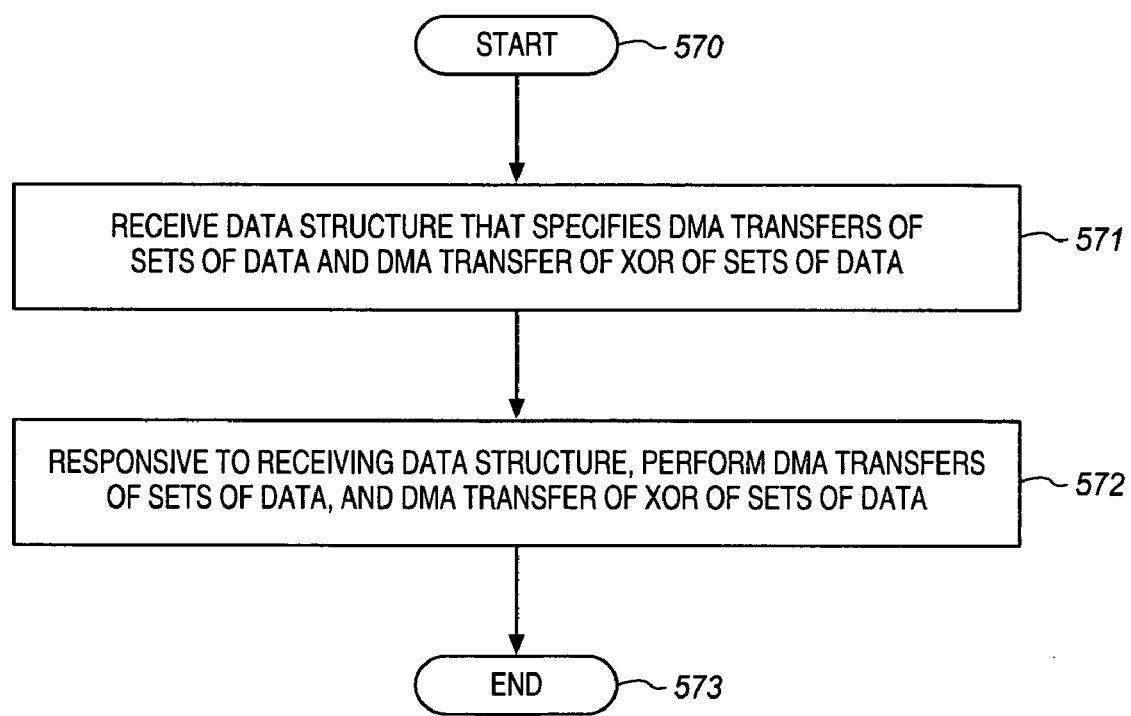
FIG. 5 is a flow diagram of a method of transferring sets of data and an XOR of the sets of data, according to one or more embodiments of the invention.

FIG. 5 is a flow diagram of a method of transferring sets of data and a logical operation, such as, for example, an XOR, of the sets of data, according to one or more embodiments of the invention. In one aspect, the method may be performed by a DMA controller or component or system incorporating DMA controller logic.

After starting, at block 570, a single data structure that specifies DMA transfers of sets of data and a DMA transfer of a logical operation, such as, for example, an XOR, of the sets of data may be received, at block 571. As discussed above, the data structure may include a DMA descriptor. The sets of data may include two or more sets of data.

Then, responsive to receiving the data structure, or at least after receiving the data structure, the DMA transfers of the sets of data, and the DMA transfer of the logical operation, such as, for example, the XOR, of the sets of data, may be performed, as shown at block 572. In one aspect, the XOR or other logical operation on the sets of data may be generated at the DMA controller. In one aspect, the XOR or other logical operation of the sets of data may be generated before a DMA transfer of at least one of the sets of data, for example the last transferred set of data, is performed. In one aspect, the DMA transfers of the sets of data and the DMA transfer of the XOR or other logical operation of the sets of data may be performed without an intervening interrupt of a processor core. The method may then end, at block 573.

The DMA controllers disclosed herein may be used for various intelligent I/O applications. Representative applications include, but are not limited to, storage, networking, and communications applications.

In one or more embodiments of the invention, the DMA controllers as disclosed herein may be used to transfer sets of data and an XOR of the sets of data to one or more storage disk arrays, according to a RAID (Redundant Array of Independent (or Inexpensive Disks) storage protocol or technology. Certain levels of RAID, such as, for example, RAID-3 and RAID-5, may store sets of data and an XOR of the sets of data to provide parity, or data redundancy, which may be used to achieve hardware fault tolerance.

By way of example, if A, and B, and A XOR B, are each stored on a different storage device, such as, for example, a different storage disk array, or RAID stack, then if any one of the storage devices storing A, B, or A XOR B fails, the lost data may be recalculated from the redundant data in the other two sets of data. For example, if storage disk array storing B fails, B may be calculated from A and A XOR B. As another example, any one of the data A, B, and C may be recalculated from the other two.

Accordingly, in one or more embodiments of the invention, a DMA controller as disclosed herein may assist with providing sets of data and an XOR of the sets of data to storage devices for storage according to a RAID technology or protocol.

As another option, in one or more embodiments of the invention, the DMA controller as disclosed herein may assist with providing the sets of data and the XOR of the sets of data to an encryption or decryption logic, which may use the data and XOR to perform encryption or decryption. Representative examples include, but are not limited to, Advanced Encryption Standard (AES) logic and/or Triple Data Encryption Standard (3DES) logic. This may free a processor from needing to perform the XOR operations. Still further, in one or more embodiments of the invention, a logical encryption operation on data may optionally be transferred in place of, or in addition to, the aforementioned XOR of the data.

As yet another option, in one or more embodiments of the invention, the DMA controller as disclosed herein may assist with providing the sets of data and the XOR of the sets of data to hashing logic, which may use the data and XOR. Representative examples include, but are not limited to, Message Digest 5 (MD5) logic, virtual private network (VPN) logic, and/or Secure Hash Algorithm (SHA-1) logic. This may free a processor from needing to perform the XOR operations.

These are just a few illustrative examples. The scope of the invention is not limited to just these examples.

Figure 6:
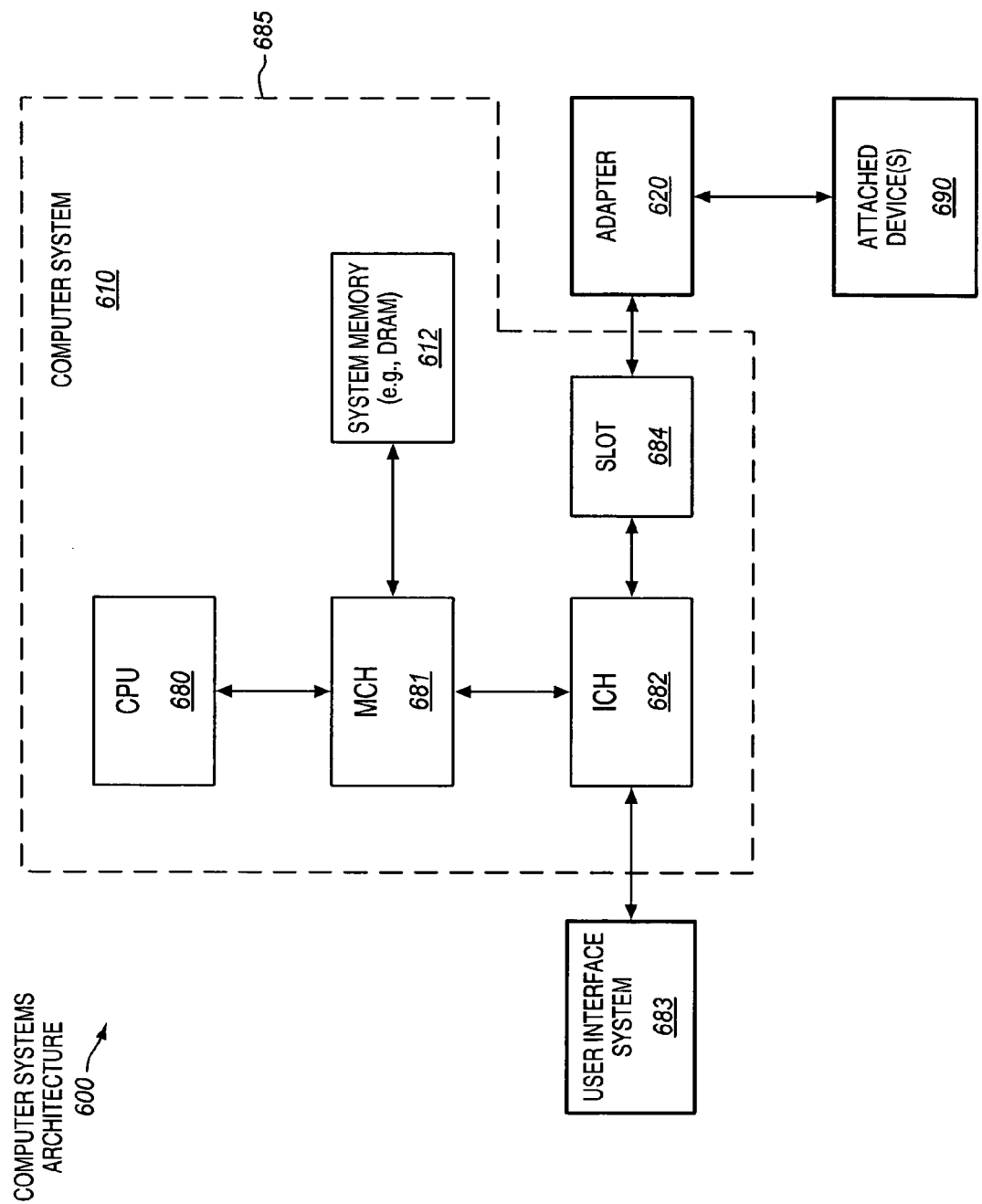
FIG. 6 is a block diagram showing a computer systems architecture suitable for implementing one or more embodiments of the invention.

FIG. 6 is a block diagram showing a computer systems architecture 600 suitable for implementing one or more embodiments of the invention. The computer systems architecture includes a computer system 610, one or more attached device(s) 690, an adapter 620 to facilitate exchange of data between the computer system and the attached device, and an optional user interface system 683.

As used herein, a "computer system" may include an apparatus having hardware and/or software to process data, for example by executing sequences of instructions. The computer system may include, but is not limited to, a portable, laptop, desktop, server, or mainframe computer, to name just a few examples. The computer system represents one possible computer system for implementing one or more embodiments of the invention, although other computer systems and variations of the computer system are also possible.

The computer system includes a CPU 680, which is sometimes referred to simply as a processor, to process information. In one or more embodiments, the processor may include a processor in the PENTIUM® family of processors, such as, for example, a PENTIUM® 4 processor, although the scope of the invention is not limited in this respect. The PENTIUM® family of processors are commercially available from Intel Corporation, of Santa Clara, Calif. Alternatively, other processors may optionally be used. As one example, a processor having multiple processing cores may be used. Further, in one or more embodiments, the computer system may include multiple processors.

The processor is coupled with other components of a chipset by a bus. The bus is an interconnect or data transmission path. In one or more embodiments of the invention, the chipset may include a first bridge/hub, such as, for example, a memory control bridge/hub (MCH) 681 available from Intel Corporation, and a second bridge/hub, such as, for example, an input/output (I/O) bridge/hub (ICH) 682 available from Intel Corporation. In one or more other embodiments, at least a portion or all of the MCH may be integrated with the processor, for example on the same chip. The MCH may be coupled with the ICH by a hub interface. However, the scope of the invention is not limited to the particular chipset illustrated, and other chipsets are also suitable.

The computer system includes a system memory 612 that is coupled with, or otherwise in communication with the chipset, by one or more buses or other interconnects or data transmission paths. As shown in the illustrated embodiment, the system memory may be coupled with the MCH by a bus.

In one or more embodiments of the invention, the system memory may include a main memory, such as, for example, a random access memory (RAM) or other dynamic storage device, to store information including instructions to be executed by the processor. Different types of RAM memory that are included in some, but not all computer systems, include, but are not limited to, static-RAM (SRAM) and dynamic-RAM (DRAM). Other types of RAM that are not necessarily dynamic or need to be refreshed may also optionally be used.

The computer system may also include a read only memory (ROM), which is not shown. The ROM may store static information and instructions for the processor, such as, for example, the basic input-output system (BIOS). In some but not all embodiments of the invention, flash BIOS may be used. In flash BIOS, the BIOS may be stored on a flash memory. Other types of memory, such as, for example, programmable ROM (PROM), erasable-and-programmable ROM (EPROM), and electrically-erasable-and-programmable ROM (EEPROM), may also potentially be used.

The optional user interface system is coupled with, or otherwise in communication with, the chipset by one or more buses or other data transmission paths. In the illustrated embodiment, the user interface system is coupled with the ICH. The user interface system may representatively include devices, such as, for example, a display device, a keyboard, a cursor control device, and combinations thereof, although the scope of the invention is not limited in this respect. For example, some computer systems, such as servers, may optionally employ simplified user interface systems.

The computer system may further include a slot 684. The slot may be coupled with, or otherwise in communication with, the chipset by one or more buses, other interconnects, or other data transmission paths. As shown in the illustrated embodiment, the slot may be coupled with the ICH.

In one or more embodiments, the computer system may optionally include a housing or chassis 685. The CPU, the MCH, the ICH, the system memory, and the slot, may be housed within the housing or chassis. These components may be integrated with a motherboard, backplane, or other single main circuit board of the computer system. The adapter may be inserted into the slot, which may represent an opening in the housing or chassis, and thereby coupled with the main circuit board. Alternatively, the computer system may omit the housing or chassis.

The adapter may be inserted into the slot. When the adapter is inserted into the slot, the electrical components of the adapter may be electrically coupled with, or otherwise in communication with, at least some of the electrical components of the computer system, for example the system memory.

In one or more embodiments of the invention, the adapter may include an I/O processor and/or a DMA controller having XOR logic, as disclosed elsewhere herein. As shown in FIG. 1, the adapter may include other components. In one or more embodiments, the adapter may include subsets or supersets of components similar to those of the INTEL® 80332 I/O Processor, which is commercially available from Intel Corporation, of Santa Clara, Calif. The INTEL® 80332 I/O Processor includes an core, an x8 PCI Express upstream link, two PCI Express-to-PCI bridges supporting PCI-X interface, a PCI standard hot-plug controller, an address translation unit, a high performance memory controller, an interrupt controller with seventeen external interrupt inputs, two DMA controllers, an application accelerator, a messaging unit, peripheral bus interface unit, a performance monitor, two Inter-Integrated Circuit (I2C) bus interface units, two 16550 compatible UARTs with flow control, and eight general purpose I/O (GPIO) ports. In one or more embodiments, the Intel XScale® core and DMA controller of the Intel® 80332 I/O Processor may be adapted to include the logic and methods disclosed herein, although the scope of the invention is not limited in this respect. Further background information on the Intel® 80332 I/O processor, if desired, is available in the Developer's Manual (Document No. 274065-002US), which was published August 2004, and which is available from Intel Corporation. Chapter 6 includes further background information on the DMA controller.

The attached device(s), such as, for example, storage device(s), may be coupled with the adapter, via one or more communication links. The adapter may have one or more connectors or other ports for the communications links. Suitable storage devices include, but are not limited to, hard disks, pluralities of hard disks, arrays of hard disks, storage disk arrays, redundant arrays of inexpensive disks, CD-ROM devices, tape drives, Zip drives, SuperDisk drives, and the like.

The computer system may exchange data with the attached device(s) via the adapter. In one or more embodiments of the invention, the adapter may assist in performing DMA transfers of data between the computer system and the attached devices.

Figure 7:
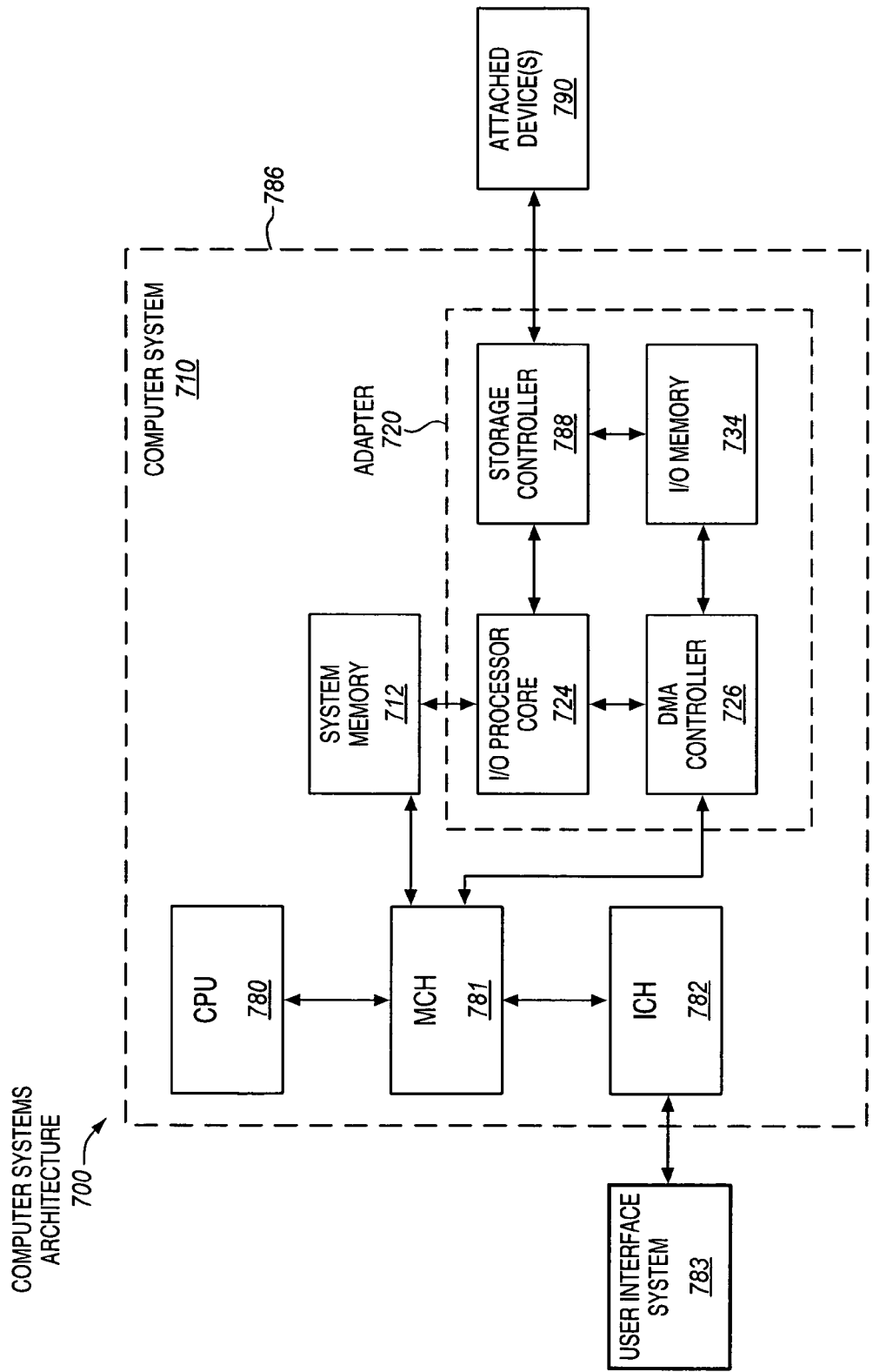
FIG. 7 is a block diagram showing an alternate computer systems architecture suitable for implementing one or more embodiments of the invention.

The scope of the invention is not limited to including the DMA controller and/or I/O processor in an adapter that may be inserted into a slot. FIG. 7 is a block diagram showing an alternate computer systems architecture 700 suitable for implementing one or more embodiments of the invention. The computer systems architecture includes a computer system 710, one or more attached device(s) 790, an adapter 720 to facilitate exchange of data between the computer system and the attached device(s), and an optional user interface system 783.

The illustrated computer system includes a CPU 780, a MCH 781, an ICH 782, a system memory 712, and a motherboard or main circuit board 786. The CPU, the MCH, the ICH, and the system memory are integrated with or otherwise provided on the motherboard or main circuit board of the computer system.

The adapter includes an I/O processor core 724, a DMA controller 726, a storage controller 788, and an I/O memory 734. As shown, the adapter, including each of the I/O processor core, the DMA controller, the storage controller, and the I/O memory, may be integrated with or otherwise provided on the motherboard or main circuit board of the computer system.

The storage controller is bidirectional coupled with, or otherwise in bidirectional communication with, the attached device(s). The I/O processor core is bidirectional coupled with, or otherwise in bidirectional communication with, the attached device(s) through the storage controller. The illustrated storage controller is included in the adapter and on the motherboard, although this is not required. The DMA controller is bidirectional coupled with, or otherwise in bidirectional communication with, the MCH. The I/O processor core is bidirectionally coupled with, or otherwise in bidirectional communication with, the system memory. The I/O processor core may access system memory through this controller, such as, for example, to exchange control information. Other components of the adapter are in bidirectional communication with one another as shown by the bidirectional arrows.

In the illustrated embodiment, the DMA controller, the I/O processor core, the I/O memory, and the storage controller, are each provided as stand alone chips or other microelectronic devices that are individually coupled with the motherboard, although the scope of the invention is not limited in this respect. In various alternate embodiments of the invention, one or more of the DMA controller and the I/O processor core may be integrated with another chipset component. As one example, the DMA controller may optionally be integrated with the MCH. Bringing the DMA controller logically closer to the CPU may offer certain potential advantages. As another example, the DMA engine may be integrated with the I/O processor core, such as, for example, to allow sharing of XOR logic. As yet another example, the DMA controller, the I/O processor, and the ICH may optionally be integrated together. Various other integrations are contemplated. The scope of the invention is not limited to any particular configuration of such chipset components.

Still other computer system architecture embodiments suitable for implementing the invention are also contemplated. For example, in one or more embodiments of the invention, rather than the adapter being inserted into a slot, the adapter may be external and may be coupled with the motherboard via a cable or other connector.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description.

Various operations and methods have been described. Some of the methods have been described in a basic form, but operations may optionally be added to and/or removed from the methods. The operations of the methods may also optionally be performed in different order. Many modifications and adaptations may be made to the methods and are contemplated. For example, rather than just performing XOR operations on two sets of data, an XOR operation may be performed on three, four, five, ten, or more sets of data, and then transferred.

Certain operations may be performed by hardware components, or may be embodied in machine-executable instructions, that may be used to cause, or at least result in, a circuit programmed with the instructions performing the operations. The circuit may include a general-purpose or special-purpose processor, or logic circuit, to name just a few examples. The operations may also optionally be performed by a combination of hardware and software.

One or more embodiments of the invention may be provided as a program product or other article of manufacture that may include a machine-accessible and/or readable medium having stored thereon one or more instructions and/or data structures. The medium may provide instructions, which, if executed by a machine, may result in and/or cause the machine to perform one or more of the operations or methods disclosed herein. Suitable machines include, but are not limited to, computer systems, adapters, I/O processors, and a wide variety of other devices with one or more processors, to name just a few examples.

The medium may include, a mechanism that provides, for example stores and/or transmits, information in a form that is accessible by the machine. For example, the medium may optionally include recordable and/or non-recordable mediums, such as, for example, floppy diskette, optical storage medium, optical disk, CD-ROM, magnetic disk, magneto-optical disk, read only memory (ROM), programmable ROM (PROM), erasable-and-programmable ROM (EPROM), electrically-erasable-and-programmable ROM (EEPROM), random access memory (RAM), static-RAM (SRAM), dynamic-RAM (DRAM), Flash memory, and combinations thereof.

A medium may also optionally include an electrical, optical, acoustical, radiofrequency, or other form of propagated signal, such as carrier waves, infrared signals, digital signals, for example. One or more embodiments of the invention may be downloaded as a computer program product, wherein the program may be transferred from one machine to another machine by way of data signals embodied in a carrier wave or other propagation signal or medium via a communication link (for example a modem or network connection).

For clarity, in the claims, any element that does not explicitly state "means for" performing a specified function, or "step for" performing a specified function, is not to be interpreted as a "means" or "step" clause as specified in 35 U.S.C. Section 112, Paragraph 6. In particular, any potential use of "step of" in the claims herein is not intended to invoke the provisions of 35 U.S.C. Section 112, Paragraph 6.

It should also be appreciated that reference throughout this specification to "one embodiment", "an embodiment", or "one or more embodiments", for example, means that a particular feature may be included in the practice of the invention. Such recitations do not necessarily refer to the same embodiment. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

Accordingly, while the invention has been thoroughly described in terms of several embodiments, those skilled in the art will recognize that the invention is not limited to the particular embodiments described, but may be practiced with modification and alteration within the spirit and scope of the appended claims. The description is thus to be regarded as illustrative instead of limiting.

What is claimed is:

1. A method comprising:
receiving a Direct Memory Access (DMA) descriptor specifying a data A, specifying a data B, and specifying that A exclusive OR (XOR) B is to be generated;
receiving the data A concurrently with the data B at a DMA controller through DMA transfers of the data A and the data B;
generating the A XOR B in-line by performing an XOR operation on the data A and the data B at the DMA controller as the data A and the data B are received at the DMA controller, wherein the XOR operation is performed on the data A and the data B after the DMA transfers of the data A and the data B to the DMA controller, and wherein the XOR operation is performed without storing the data A or the data B in a buffer of the DMA controller before the A XOR B is generated; and
performing a DMA transfer of a result that is based on the A XOR B concurrently with the DMA transfers of the data A and the data B, wherein the DMA transfers of the data A, the data B, and the result are performed without storing the data A, the data B, or the result in the buffer of the DMA controller.

2. The method of claim 1, wherein the DMA transfers of the data A, the data B, and the result are performed without an intervening interrupt of a processor core.

3. The method of claim 1, wherein the result that is based on the A XOR B comprises A XOR B.

4. An apparatus comprising:
an interconnect to convey a Direct Memory Access (DMA) descriptor that specifies DMA transfers of a plurality of sets of data and that specifies a DMA transfer of a logical operation performed on the plurality of the sets of data; and
a DMA controller in communication with the interconnect to receive the DMA descriptor, the DMA controller including logic to perform the logical operation on the plurality of the sets of data in-line with the DMA transfers of the plurality of the sets of data, wherein the logic is to perform the logical operation after the plurality of the sets of data have been DMA transferred to the DMA controller, wherein the logic is to perform the logical operation without the plurality of the sets of data being stored in a buffer of the DMA controller prior to the logical operation being performed, wherein the DMA controller is to perform the DMA transfers of the plurality of the sets of data to a destination at least partially concurrently with the DMA transfer of the logical operation to the destination, and wherein the DMA controller is to perform the DMA transfers of the plurality of the sets of data and the DMA transfer of the logical operation to the destination without storing the plurality of the sets of data or the logical operation in the buffer of the DMA controller.

5. The apparatus of claim 4, wherein the logical operation comprises an exclusive OR on the plurality of the sets of data.

6. The apparatus of claim 4, wherein the plurality of the sets of data and the logical operation performed on the plurality of the sets of data are to pass through the DMA controller concurrently from source memory locations to the destination.

7. The apparatus of claim 4, wherein the logical operation comprises an exclusive OR on the plurality of the sets of data, and wherein the plurality of the sets of data and the logical operation performed on the plurality of the sets of data are to pass through the DMA controller concurrently from source memory locations to the destination.

8. The apparatus of claim 4, wherein the plurality of the sets of data comprise a data A and a data B, and wherein the logical operation comprises A exclusive OR (XOR) B.

9. The apparatus of claim 4, wherein the DMA controller does not have a buffer to store an intermediate result associated with the logical operation performed on the plurality of the sets of data.

10. A system comprising:
a computer system including a dynamic random access memory (DRAM);
an adapter coupled with the computer system, the adapter including:
an interconnect to convey a Direct Memory Access (DMA) descriptor that specifies DMA transfers of a plurality of sets of data in the computer system and that specifies a DMA transfer of a logical operation performed on the plurality of the sets of data; and
a DMA controller in communication with the interconnect to receive the DMA descriptor, the DMA controller including logic to perform the logical operation on the plurality of the sets of data in-line with the DMA transfers of the plurality of the sets of data, wherein the logic is to perform the logical operation after the plurality of the sets of data have been DMA transferred to the DMA controller, wherein the logic is to perform the logical operation without the plurality of the sets of data being stored in a buffer of the DMA controller prior to the logical operation being performed, wherein the DMA controller is to perform the DMA transfers of the plurality of the sets of data to a destination at least partially concurrently with the DMA transfer of the logical operation to the destination, and wherein the DMA controller is to perform the DMA transfers of the plurality of the sets of data and the DMA transfer of the logical operation to the destination without storing the plurality of the sets of data or the logical operation in the buffer of the DMA controller; and
one or more attached devices coupled with the adapter, wherein the one or more attached devices include the destination.

11. The system of claim 10, wherein the logical operation comprises an exclusive OR on the plurality of the sets of data.

12. The system of claim 10, wherein the plurality of the sets of data and the logical operation performed on the plurality of the sets of data are to pass through the DMA controller concurrently from source memory locations to the destination.

* * * * *